July 21, 1925.  
E. C. OLIVER  
1,546,453  
AUTOMATIC GRINDER FOR TWIST DRILLS  
Filed July 12, 1921  
5 Sheets-Sheet 1

Fig. 1.

INVENTOR.  
Edd C. Oliver.  
BY  
ATTORNEY.

July 21, 1925.  
E. C. OLIVER  
1,546,453  
AUTOMATIC GRINDER FOR TWIST DRILLS  
Filed July 12, 1921    5 Sheets-Sheet 5

INVENTOR.  
Edd C. Oliver  
BY  
ATTORNEY.

Patented July 21, 1925.

1,546,453

UNITED STATES PATENT OFFICE.

EDD C. OLIVER, OF ADRIAN, MICHIGAN.

AUTOMATIC GRINDER FOR TWIST DRILLS.

Application filed July 12, 1921. Serial No. 484,024.

*To all whom it may concern:*

Be it known that I, EDD C. OLIVER, a citizen of the United States, residing at Adrian, county of Lenawee, State of Michigan, have invented a certain new and useful Improvement in Automatic Grinders for Twist Drills, and declare the following to be a full, clear, and exact description of the same, such as will enable others skilled in the art to which it pertains to make and use the same, reference being had to the accompanying drawings, which form a part of this specification.

This invention relates to automatic drill grinders, and its object is to provide an automatically operating mechanism to grind the cutting ends of twist drills of either two, three or four lipped type as the case may be, in which the cutting lips of the drill are accurately positioned for the grinding operation and in which the drill is automatically turned to present the cutting lips successively to the grinding wheel in accurate relationship therewith.

Hand ground drills are imperfect due to the inability of the eye of the workman to accurately determine the lengths of the cutting edges or the angle thereof and naturally the lips of a twist drill must be identical as to the length of the cutting edge as well as the angle thereof. Otherwise the drill will form oversized apertures or apertures that are not truly round in form and furthermore, the speed of penetration may be retarded due to variation in the cutting angle or length of the cutting edges in which case only one lip would be doing the work. In my improved automatic machine for grinding the cutting ends of twist drills, such inaccuracies are impossible due to the mechanically correct positioning of the drill relative to the grinding wheel and the mechanically accurate means utilized to present the lips of the drill successively for the grinding operation.

I have further discovered that a twist drill ground to a peculiar form as hereinafter described, is more highly efficient than the usual types of drills and method of grinding the cutting ends. Therefore, an object of this invention is to provide a grinding device having an abrasive wheel that, as it begins to grind the cutting edge, grinds the same on a perfectly straight line at the correct angle and back of the cutting edge is fed in to produce a concave form of face of each land, which concavity increases from just back of the cutting edge to the rear of the land. A further object of this invention is to provide a grinding wheel whereby each land at cutting end may be automatically ground exactly alike. The various objects and novel features of construction are hereinafter more fully described and claimed and the preferred form of construction of a drill grinder embodying my invention is shown in the accompanying drawings in which—

Figure 1:
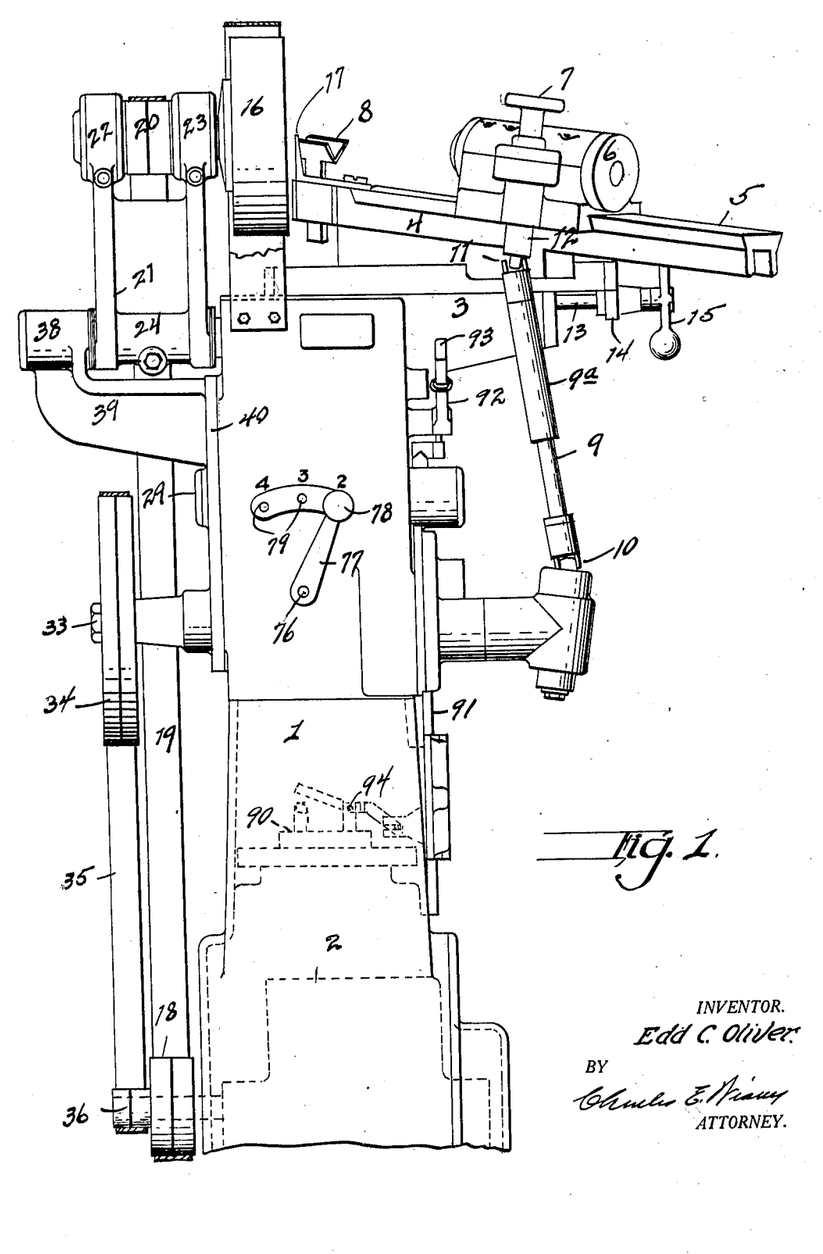
Fig. 1 is a side elevation of my improved automatic drill grinding device.

The machine may be belt driven but is preferably of a motor driven type and consists of a frame or standard 1 in the base of which is mounted a motor indicated by dotted lines 2 in Fig. 1, and this standard or frame is provided with what I have termed a table 3 at the upper end. Beneath the table in the interior of the standard is the operating mechanism hereinafter described in detail. Supported on the table is a carrier 4, the table having a longitudinal way 3ª as will be understood from Fig. 2 in which the base of the carrier rests.

Figure 3:
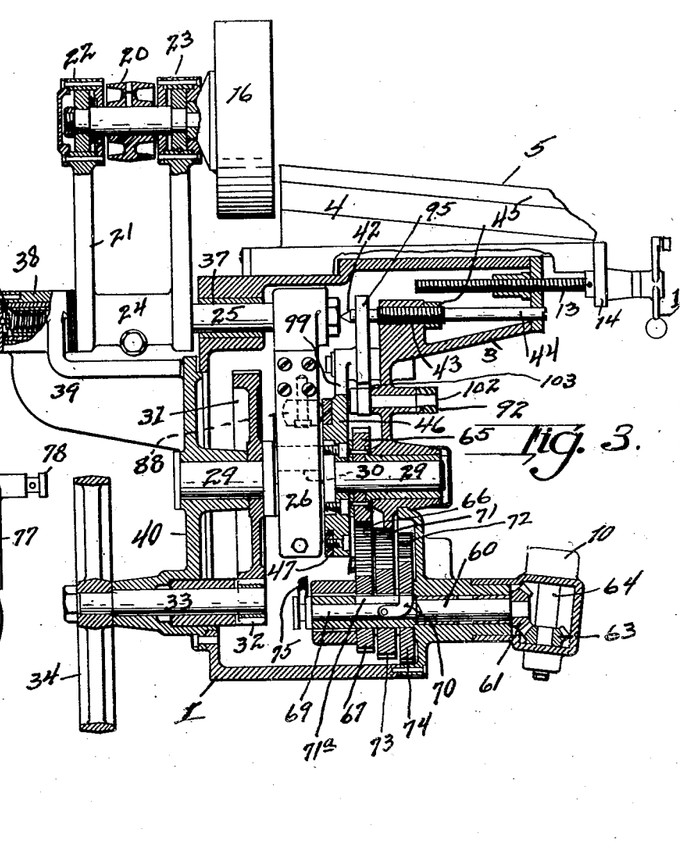
Fig. 3 is a view on an enlarged scale showing parts partly in section and partly in elevation illustrating the mechanism utilized in operating the grinding wheel and the means employed for turning the drill to present the cutting lips successively for the grinding operation.

The carrier is provided with a way 5 having undercut edges on which is carried a rotatable spindle or element 6 carried in a bearing 6ª adjustable longitudinally of the way and having portions fitting the undercut edges of the way and further being provided with a hand operated member 7ª to fixedly secure the spindle in the desired position. At the forward end of the way is a V shaped member 8 in which the forward cutting end of the drill rests during the grinding operation. The spindle is provided with a central aperture and is of the ordinary type adapted to engage the shank of the drill and to rotate the same as hereinafter described. This spindle is driven by means of a shaft 9 connected as hereinafter described with the driving mechanism and is provided at the lower end with a universal joint 11. The shaft 9 is further provided with a telescoping member 9ª in keyed relation with the part 9 permitting an extension or contraction of the shaft longitudinally to accommodate the position of the spindle longitudinally of its way. Due to the various angles at which the shaft 9 may operate, universal joints are necessary to permit the same to be driven at any desired angle to the driving shaft. The universal joint 11 is connected with the shaft 12 of the spindle which is provided with means (preferably a worm not here shown) for rotating the spindle within its case or housing 6ª. The spindle housing is movable longitudinally of its way to permit accommodation for drills of different lengths. The base 4 supporting the way 5 is movable longitudinally of the bed 3 by means of the screw 13 having a collar bracket 14 attached to the base of the way as is illustrated in Fig. 3 and is provided with a handle member 15 for rotating the screw to move the table backward or forward to accurately position the cutting end of the drill relative to the grinding wheel 16. Preferably a guide member 17 is provided at the forward end of the drill support 8 to permit adjustment in position of the cutting end of the drill when the grinding wheel is out of grinding position.

Figure 4:
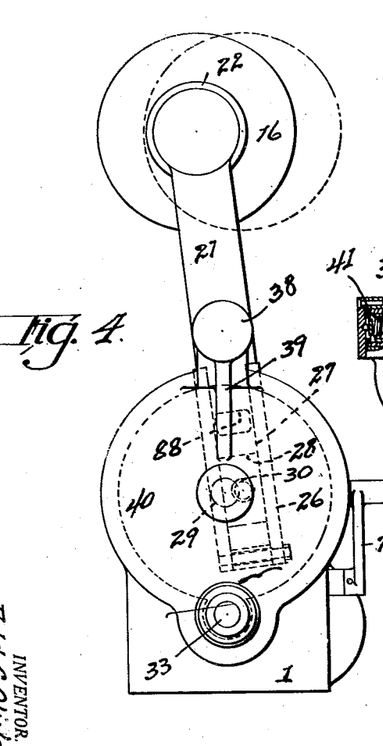
Fig. 4 is an end view of Fig. 3.

The shaft of the motor 2 is provided with a belt wheel 18 and a belt 19 thereon extends about the pulley 20 on the shaft of the grinding wheel. This grinding wheel shaft is supported in the yoke 21 having two bearings 22 and 23 at the upper end for the grinding wheel shaft as will be readily understood from Fig. 1. This yoke has a cylindrical cross portion 24 of a split type enabling it to be clamped to a rock shaft 25 as will be understood particularly from Fig. 3. This shaft is rocked by means of an arm 26 secured thereto, the lower end of which is bifurcated as shown by dotted lines 27 in Fig. 4 and in which bifurcation a slide block 28 is provided. The main shaft 29 of the device is provided with a crank indicated by dotted lines 30 in Fig. 3 which crank passes through the block 28. Rotation of the shaft 29 and crank 30 thereon oscillates the arm 26 and rocks the shaft 25 and thus oscillates the yoke 21 moving the grinding wheel backward and forward for each complete rotation of the shaft 29. The shaft 29 is provided with a gear wheel 31 with which meshes the driving gear 32 on a shaft 33 on which shaft 33 is a belt wheel 34 driven by a belt 35 extending to a pulley 36 on the shaft of the motor 2. Thus continued rotation of the driving shaft and the shaft 29 operated thereby continuously oscillates the grinding wheel.

The rock shaft 25 is also movable longitudinally in its bearings, one of which is shown at 37 in Fig. 3 and the other of which is shown at 38 being provided at the outer end of an arm 39 carried by a plate or housing 40 secured to the side of the standard. This shaft 25 at the bearing 38 is hollow and a coiled compression spring 41 is provided therein tending to at all times force the shaft 25 and the grinding wheel carried thereby toward the right in Fig. 3. Thus the shaft may have longitudinal movement as well as an oscillating movement as hereinafter described and the extent to which the shaft may be moved to the right by the spring is limited by a cam 46. A center 42 is threaded in the supporting member 43 at the head of the machine and is provided with a shank 44 extending outward to the end thereof and slotted to permit turning of the same by means of a screw driver or the like. A lock nut 45 is also provided on the center to lock the same in adjusted position. As will be understood this center 42 is on an extended longitudinal axis of the shaft 25 and is utilized to force the shaft 25 and connected parts to the left of the position shown in Fig. 3. The roller 88 may thus be moved out of contact with the cam 46 to permit the face of the grinding wheel to run free while the face thereof is being trued.

Figures 5, 6, 7, 8:
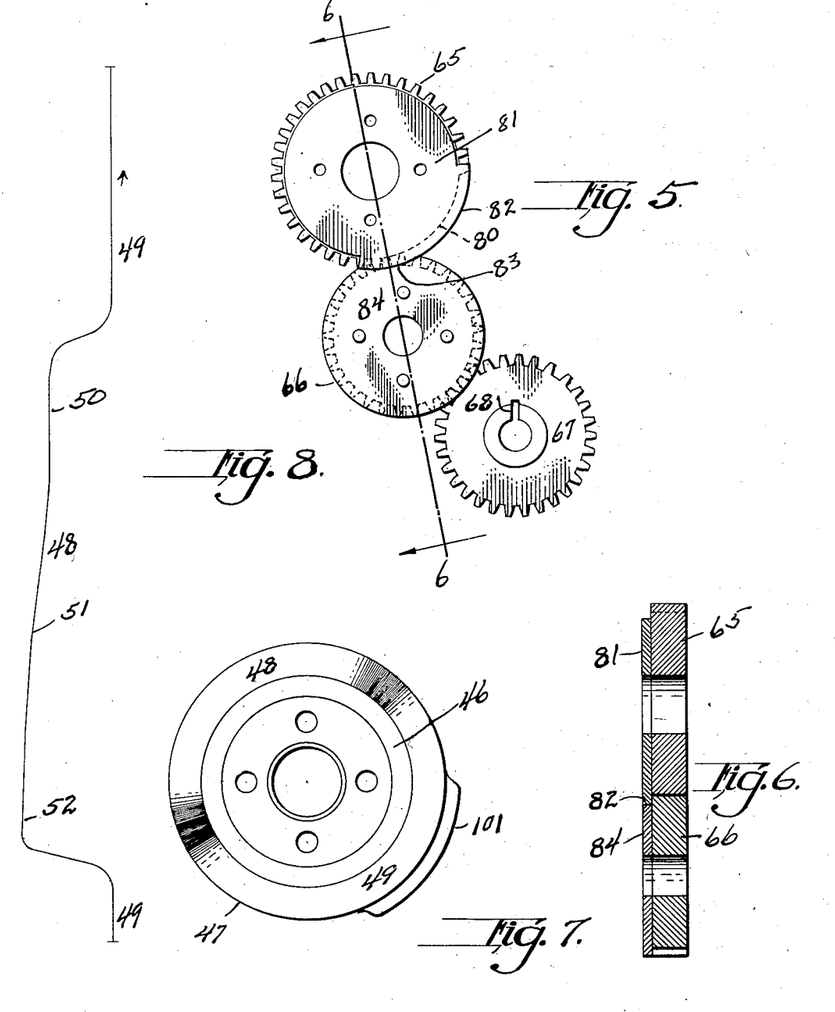
Fig. 5 is an elevation of the gear train utilized in turning the drill to present the cutting lips successively for the grinding operation.
Fig. 6 is a section taken on line 6—6 of Fig. 5.
Fig. 7 is an elevation of the cam controlling the feeding movement of the grinding wheel.
Fig. 8 is a development on an enlarged scale of the face of the cam shown in Fig. 7.

The longitudinal movement of the shaft 25 and consequent movement of the grinding wheel to the left or right toward or from the end of the drill to be ground is controlled by a rotatable cam secured to the shaft 29. The side of this member 46 has a cam ring 47 thereon against which rides a roller 88, which roller is carried in the oscillatable arm 26. In the position of the parts shown in Fig. 3 the roller is engaging a low portion of the cam and a high portion of the cam will tend to move the lever and shaft 25 and grinding wheel carried thereby to the left of the position shown in Fig. 3 and therefore out of grinding contact with the cutting end of the drill. This cam member is shown in Figs. 7 and 8, Fig. 7 showing the face of the cam which has the low part 48 and the high part 49. A development of this cam is shown on an enlarged scale in Fig. 8 and the roller engages the right hand side of this diagram and, as will be understood, when the roller is engaging the part 49 of the cam, the grinding wheel is out of contact with the drill as the roller rides off from the part 49 by rotation of the cam in the direction of the arrow shown in Fig. 8, it rides onto the portion 50 of the low part of the cam. This portion, as will be observed, is straight and at a right angle to the axis of the cam for a short distance and then extends at an acute angle indicated by the line 51 for a distance, and then gradually increases in depth to the extreme low point 52 from which the roller 88 rides out to the high point 49.

Figure 10:
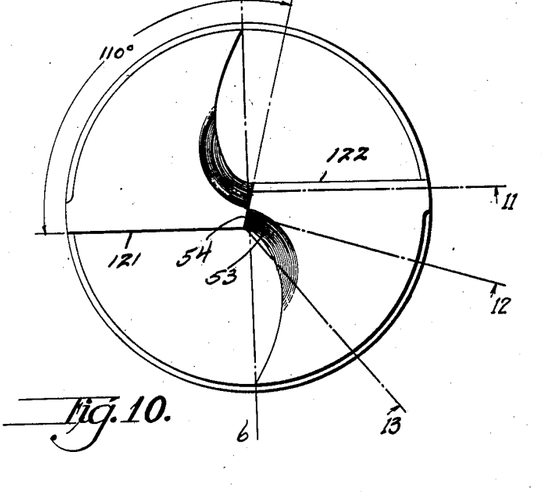
Fig. 10 is an end view of a two-lipped drill as ground by my improved device.
Figure 11:
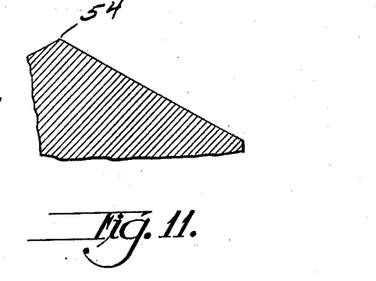
Fig. 11 is a section taken on line 11 of Fig. 10.
Figure 12:
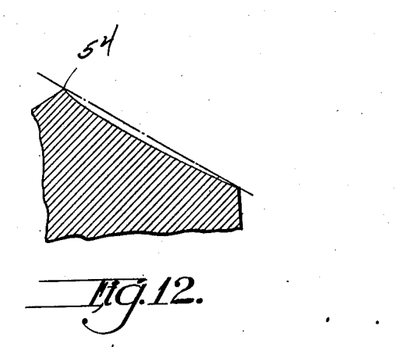
Fig. 12 is a section taken on line 12 of Fig. 10.

The purpose of this peculiar shape of the low part of the cam is particularly to provide the form of cutting end of the drill shown in Figs. 10 to 15. I have found by experiment and use in production (particularly with a two-lipped twist drill) that a greatly increased efficiency is secured over that of the ordinary drill by the provision of a peculiar cutting end which this grinding machine is adapted to automatically provide. Firstly—to increase the length of the cutting edge I have formed the angle of the point 54 of web intersection relative to the cutting edge 121 or 122 at about one hundred and ten degrees as shown in Fig. 10, the cutting edges extending very nearly to a diametrical line 5—6. I have further found that the cutting edge should be ground straight on the face as illustrated particularly in Fig. 11 and just back of this straight portion (which may be formed at the desired cutting angle) the land end is made concave in form as indicated in Fig. 12, this concavity increasing from just back of the cutting edge to the rear of the land as will be understood from Fig. 13. In the two-lipped drill I also prefer to provide an accentuated depression just forward of the point at the rear of the land. This accentuation is illustrated at 53 in Fig. 13 and by shade lines in Fig. 10. This provides a clearance making a chisel point of the point 54 of the web intersection thus providing a cutter at the center which cuts away the material rather than crushing or pulverizing it as is the case with the ordinary types of twist drills. The drill is also formed with the necessary clearance angle as well as being ground hollow back of the cutting edge.

Figure 15:
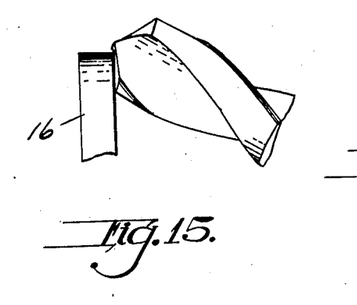

An object of this invention is to provide a machine that will produce an improved and superior form of drill point. This is secured through the use of a grinding wheel, the plane of which is fixed relative to the drill axis. In the construction here shown, the wheel is moved across the face of the drill to grind the same and at the same time the wheel is moved against the drill end parallel with the longitudinal axis thereof. The drill is revolved during this feeding in movement by mechanism heretofore described and particularly just as the drill point passes the edge of the grinding wheel as shown in Fig. 15. By this construction the drill is ground with a clearance practically of equal extent clear to the point except that the point itself is not ground away and thus a hollow is produced in front of the cutting edge of the chisel point increasing in depth due to this turning of the drill and increased feeding in movement of the wheel from near the cutting edge to the rear of the land or lip. This is the desired form of drill point secured by the machine herein described.

Figure 13:
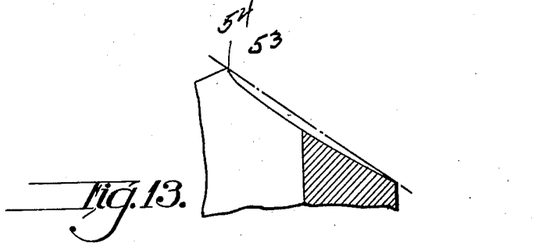
Fig. 13 is a section taken on line 13 of Fig. 10.

As stated previously, the land end is concave in form. This is only true with reference to the line cutting the drill point as shown in Figs. 12 and 13. The line indicating the face of the drill is practically a straight line to near the point 54. With this machine and the mode of its operation on a drill herein described, all radial lines on the face are practically parallel with the imaginary cone formed by rotation of the cutting edge of the lip and the shape of the land end is that of an oblique helicoid except that the point itself is not ground away. The term "oblique helicoid" refers to this straight portion of the surface of the land end which is secured by the machine described by maintaining the plane of the grinding surface in fixed relation with the axis of the drill and turning the drill during the feeding in movement of the grinding wheel which is controlled by the cam ring 47. While I have described the grinding wheel as being moved across the tool, it is a matter of choice as to whether the tool or the wheel is made to move to produce the desired peculiar shape of the drill point.

Figure 14:
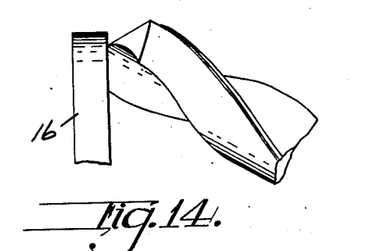
Figs. 14 and 15 are diagrams illustrating the manner in which the grinding wheel is moved across the cutting lip of the drill.

The movement of the grinding wheel relative to the drill is illustrated in Figs. 14 and 15. When the roller 88 first rides onto the portion 50 of the cam, the wheel 16 is in the position relative to the drill as shown in Fig. 14. The grinding wheel has an oscillating movement as heretofore stated and is rapidly rotated during such oscillating movement. The grinding wheel moves across the end of the drill passing to position shown in Fig. 15. As the point 1 of the web intersection approaches the edge of the grinding wheel, as will be understood from Fig. 15, the roller rides down the portion 51 of the cam which permits the grinding wheel to feed further forward onto the work by action of the spring 41. At this time and just as the roller leaves the straight part 50 of the cam the tool is rotated by the spindle 6. The feed of the grinding wheel forward against the tool is increased through the portions 51 and 52 traversed by the roller 88 and this is not only productive of the desired clearance angle but also, due to the feed of the wheel and the turning of the drill, causes the same to be hollow ground as illustrated in Figs. 12 and 13. The extreme low portion 52 of the cam, which permits the grinding wheel to move to the extreme position or limit of movement permits the wheel to cut the depression or hollow just forward of the point 1 of the web intersection indicated at 53. Thereupon the roller rides back onto the portion 49 and during its period of travel on this flat portion the grinding wheel is moved in the opposite direction for a succeeding operation. In looking at Fig. 3, the movement of the wheel is toward the observer during the grinding of the tool and as it moves out of engagement with the tool it is moved away from the observer. The rotation of the cam and operation of the arm 26 to oscillate the grinding wheel are so co-ordinated as to occur at the necessary intervals and the drill is likewise turned at the mechanically correct time relative to movement of the wheel.

Figures 2, 9:
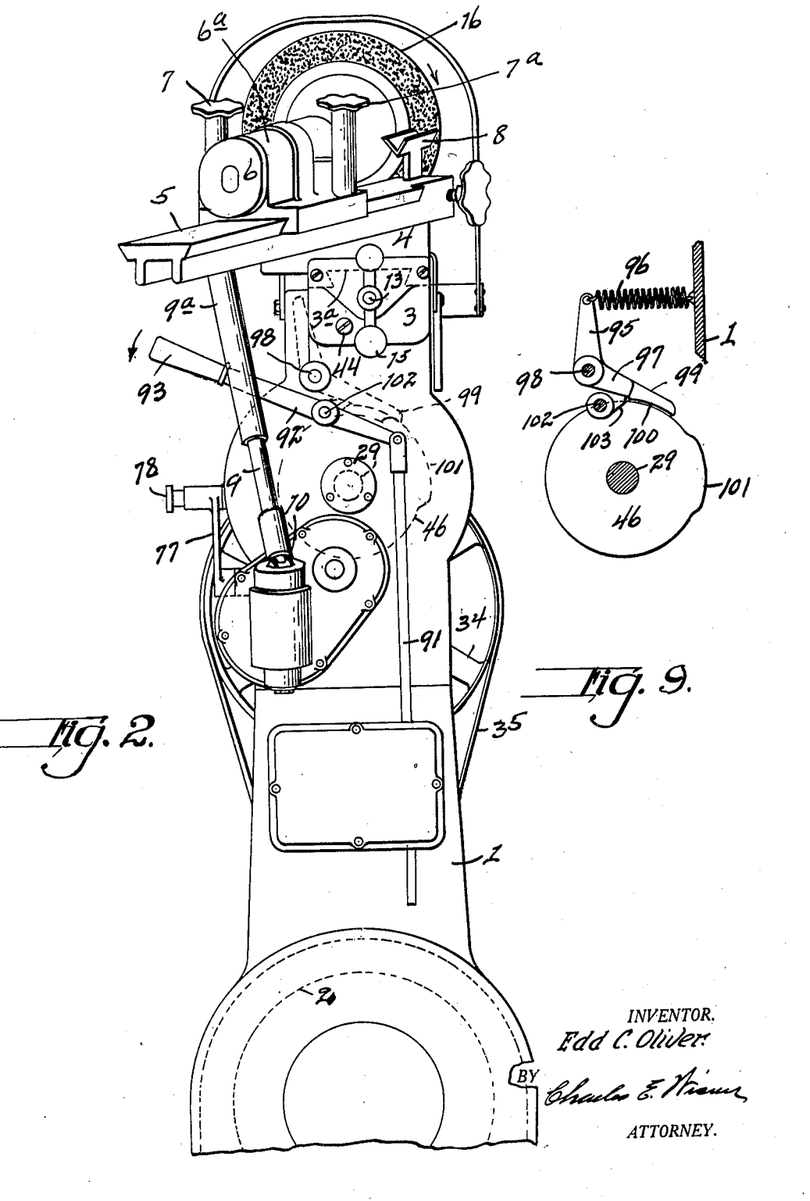
Fig. 2 is an end elevation thereof.
Fig. 9 is a detail of a brake utilized when stopping the machine to cause cessation of rotation of the various parts at a predetermined point.

The turning of the tool is occasioned by means of the shaft 60 on which is a bevel gear 61 meshing with a bevel gear 63 on the shaft 64 as shown in Fig. 3, which shaft 64 is connected by means of the universal joint 10 with the shaft 9 and therefore with the spindle 6 as heretofore described. The tool as is evident remains stationary for a short period and then is turned slowly during the grinding operation and is stopped again with the next lip in position to be ground. This is accomplished by a train of gears shown in Figs. 3, 5 and 6. The main driving gear is indicated at 65 on the shaft 29 and meshes with an idler gear 66 and this idler gear in turn meshes with a gear 67 loose on the inner end of the shaft 60. This gear 67 is provided with a keyway 68. The inner end of the shaft 60 is hollow and slidable therein is a member 69 having a key 70 extending through a slot 71ª in the wall of the hollow shaft to engagement with the keyway 68 of the gear 67 whereby the gear may be made to turn the shaft 60 and consequently the shaft 9 and rotate the tool holding spindle 6. The gear 66 is an idler gear and rotatable with this idler gear are two other gears 71 and 72 which may be secured to the same shaft or secured to the gear 66 in any approved way. Also on the shaft 60 are the gears 73 meshing with the gear 71 and the gears 74 meshing with the gear 72. The gears 73 and 74 are provided with a keyway similar to that of the gear 67 on the same shaft. Thus the key 70 may be moved to engage the gear 67, 73 or 74 as may be desired and the speed of rotation of the shaft 60 varied due to the differences in diameter of the gears. This change in the period of rotation of the shaft 60 is necessary when grinding a two, three or four lipped drill which this machine is capable of grinding. The member 69 is movable to position the key in the keyway of one or the other of the gears mentioned by means of an arm 75 on the interior of the case attached to a short shaft 76 extending to the outside of the case, as shown in Figs. 1 and 2, on which shaft is an arm 77 having a pin 78 in the upper end thereof adapted to be inserted in the apertures 79 provided on the exterior of the case and numbered 2, 3 and 4 respectively to indicate the type of drill which the machine is set to grind. Thus, with the arm 77 set as shown in Fig. 1 the proper gear is keyed to the shaft 60 to cause the necessary timed rotation of the spindle for a drill of the two-lipped type.

To secure the required intermittent rotation of the spindle 6, the gears 65 and 66 are of the mutilated type, the gear 65 having a portion 80 unprovided with teeth. A plate 81 is secured to the side of this gear and has a portion 82 overlying the part 80 not provided with teeth. This part 82 has a formed face of the exact diameter to fit in a cutout portion 83 of a plate 84 secured to the gear 66. Thus once during each revolution of the gear 65 the gear 66 is held idle and during the idle period of this gear the drill is held with one lip presented for the grinding operation. As this part 82 rides out of the part 83 of the plate 84, the teeth of the gear 65 engage those of the gear 66 and rotate the same and through the train of gearing rotates the shaft 9 and spindle 6 and turns the drill to present the next lip for operation. As the gears 71 and 72 are rotated with the gear 66 they are likewise held from rotation once during each complete rotation of the gear 65 and, due to the difference in size of the gears 71 and 72 and companions therefor 73 and 74, a single rotation of the gear 65 may turn the drill one half, one third or one fourth of a revolution depending on which gear 67, 73 or 74 is keyed to the shaft 60 and thus accommodate a two, three or four lipped type of drill. The gear 65 being keyed to the shaft 69 which also carries the cam 46, the grinding wheel is caused to make a complete grinding movement once during each revolution of the gear 65. Thus the presentation of the tool of whatever type mentioned is made to agree with the movement of the grinding wheel to grind each land thereof.

The machine, as is evident from the foregoing description, is entirely automatic in operation once it has been set for operation by keying the gear 67, 73 or 74 to the shaft 60. The grinding operation may be continued as long as desired, the tool being turned to present the lips thereof successively at the proper interval for operation by the grinding wheel in its oscillatory movement. When it is desired to stop the machine to introduce another drill for the grinding operation, it is quite desirable that the machine should be stopped at a point when the grinding wheel is at the beginning of its movement. It is therefore necessary to provide some means to prevent an overrun of the gearing which by its momentum might tend to continue to turn after the power has been disconnected. I have therefore provided a switch indicated by the dotted lines 90 in Fig. 1 which is connected to a bar 91 on the outside of the standard. This bar is connected with a pivoted lever 92 having a handle 93. This switch has a contact bar pivoted at 94 and when the handle is raised to the position shown in Fig. 2 the switch is opened and when moved in the opposite direction as indicated by the arrow in Fig. 2, the switch is closed. A brake mechanism is employed within the casing as illustrated in Fig. 9 and by dotted lines in Fig. 2. A portion of this brake is also illustrated in Fig. 3 in edge elevation. This brake consists of a rock lever having an arm 95 extending substantially in a vertical direction and a coiled spring 96 attached thereto and to the side of the standard or case. There is also provided a short arm 97 and this arm is preferably integral with the arm 95 and is mounted on the shaft 98. A long arm 99 is also provided movable in conjunction with the arms 95 and 97, and is provided with an arcuate face 100 lying over the periphery of the cam member 46 as will be understood from Figs. 2 and 3. This member 46 has a high point 101 thereon which rides beneath the arcuate portion 100 of the lever 99 at the time the grinding wheel has been moved out of grinding position by the cam 49 on the side of the member 46. The coiled spring 96 is of sufficient size and tension to stop the mechanism due to the friction of the part 99 on the high part 101 of the cam. The lever 92 for controlling the switch and brake is mounted on a shaft 102 on the side of the machine and within the case on this shaft is provided a short arm 103 which lies directly beneath the lever 97 connected with the levers 95 and 99. In the position of the parts shown in Fig. 9, which is the position shown in Fig. 2, the switch has been opened and the momentum of the parts tends to carry the point 101 of the cam 46 under the lever 99 which stops the machine when freed from its power. At this time the ground drill may be removed and a new drill positioned for operation whereupon the handle 93 of the lever 92 is depressed closing the switch and this downward movement of the lever 92 turns the arm 103 upward beneath the arm 97 raising the arm 99 from the cam point 101 freeing the mechanism to operation by the motor and when it is desired to again stop the machine the handle 93 is raised turning the part 103 to position shown in Fig. 9 permitting the spring 96 to depress the arm 99 to position shown for engagement by the cam point. Thus only at the time of stopping the machine is the member 99 in position to be engaged by the cam 101. At all other times during operation of the machine the member 99 is raised out of position to be engaged by the cam 101. Any desired type of brake mechanism may be used, however, without departing from the spirit of this invention.

The machine may operate successfully upon a drill of the two lipped type and then upon three and then a four lipped type of drill merely by a change of the lever 77 and a corresponding change in the shaft key 70 when a change in the type of drill is to be made.

The operation of the device may be readily understood from the foregoing description. The grinding wheel is oscillated backward and at the end of its movement is moved inward to engage against the drill end. As the wheel draws across the drill end, the drill is turned and the grinding wheel is fed in to an increasing extent due to the shape of the cam part 48. The wheel is then moved outward and then backward during which interval a succeeding lip of the drill is brought to position to be ground and the operation is repeated automatically and the drill is ground to the desired extent.

Having thus described my invention, what I claim and desire to secure by Letters Patent of the United States is—

1. In a machine for grinding twist drills having a plurality of cutting lips, a support for the drill adapted to securely hold the drill for the grinding operation, a rotatable grinding wheel, means for moving the grinding wheel to grinding position and across the lips to form the cutting edge, means for moving the grinding wheel to an increasing extent into the work as it approaches the completion of its grinding movement, and means operable to turn the drill to present succeeding lips for the grinding operation.

2. In a machine for grinding twist drills having a plurality of cutting lips, a holder for the drill, a rotatable grinding wheel oscillatable across the end of the tool, means for moving the grinding wheel toward the tool for grinding the same during movement in one direction and away from the cutting tool during movement in the other direction, and automatic means operable in timed relation with the movement of the grinding wheel toward and away from the drill to intermittently turn the drill to present successive lips thereof for the grinding operation.

3. In a machine for grinding twist drills having a plurality of cutting lips, a rotatable spindle adapted to securely hold the drill for the grinding operation, a rotatable grinding wheel, an oscillatable frame therefor for moving the wheel forward and back, means for moving the grinding wheel toward and from the grinding position, automatic means for rotating the spindle and turning the drill as the grinding wheel moves across the face of the tool, and means for feeding the wheel onto the tool to an increasing extent as the drill is turned, said turning means being intermittent in operation and each lip of the drill being presented for the grinding operation when the grinding wheel is out of grinding position.

4. A machine for grinding twist drills having a plurality of cutting lips comprising a support for the drill to hold the same for the grinding operation, a rotatable grinding wheel movable across the end of the drill to grind the same, means for causing movement of the grinding wheel against the work to a gradually increasing extent as the grinding wheel is moved across the face of the tool, and means for turning the tool operable when the peripheral edge of the grinding wheel has been moved a predetermined extent from the point of the web intersection.

5. In a machine for grinding twist drills having a plurality of cutting lips, a support for the drill adapted to hold the same for the grinding operation, a rotatable grinding wheel oscillatable to and fro across the end of the drill, the grinder being out of engagement with the drill during movement in one direction and engaging the drill during movement in the other direction, means for oscillating and means for rotating the grinding wheel, automatic means for feeding the grinding wheel against the work to a gradually increasing degree and to a predetermined extent as the grinding wheel is drawn across the face of the tool, and means for intermittently turning the tool to present successive lips thereof for the grinding operation.

6. In a machine for grinding twist drills having a plurality of cutting lips, a support adapted to hold the drill for the grinding operation, a rotatable grinding wheel, means for rotating the same, and means for oscillating the grinding wheel across the end of the drill, means whereby the wheel is held out of engagement with the drill during movement in one direction, and means causing the wheel to feed onto the end of the drill during movement in the opposite direction, means limiting the extent of feed of the wheel onto the tool during said last named movement, and means for intermittently turning the tool to present successive lips for the grinding operation.

7. In a machine for grinding twist drills having a plurality of cutting lips, a support adapted to hold the drill for the grinding operation, a rotatable grinding wheel, means for oscillating the wheel across the end of the tool, means for holding the wheel out of engagement with the tool during movement in one direction and permitting the same to engage the tool during movement in the other direction whereby the wheel is drawn across the end of the tool to grind the same, the structure being such that the wheel feeds into the work subsequent to the beginning of the grinding movement, means for intermittently turning the tool to present successive lips thereof for the grinding operation, said means including means whereby drills of different numbers of lips may be turned in timed relation with the movement of the grinding wheel.

8. In a machine for grinding twist drills having a plurality of cutting lips, a support for the drill adapted to hold the same for the grinding operation, a rotatable grinding wheel, means for oscillating the grinding wheel across the face of the tool out of contact therewith during movement in one direction, and means for bringing the wheel into contact with the tool to grind the same during movement in the opposite direction, the said drill support being adjustable to accommodate drills of various lengths, means for intermittently rotating the drill to present successive lips thereof for the grinding operation, and means for causing the wheel to feed onto the tool to an increasing extent as it is moved thereacross.

9. In a power operated machine for grinding twist drills having a plurality of cutting lips, a support for the drill adapted to hold the same for the grinding operation, a rotatable grinding wheel, means for oscillating the wheel across the end of the tool out of contact therewith during movement in one direction and in contact therewith during movement in the opposite direction, said means including means whereby the wheel is fed into the work to an increasing extent during the grinding movement means for intermittently turning the tool to present successive lips for the grinding operation, means for supplying power to operate the machine, means for causing cessation of operation of the machine by the power, and a brake device operated by said last named means to cause cessation of movement of the various parts of the machine at a time when the grinding wheel reaches grinding position.

10. In a machine for grinding twist drills having a plurality of cutting lips, a rotatable grinding wheel, means for oscillating the wheel to and fro across the face of the tool out of contact therewith during movement in one direction and in contact therewith during movement in the other direction, means for causing the wheel to feed onto the work to an increasing extent during its movement thereacross in grinding contact therewith, and means for turning the tool at a predetermined point of travel of the grinding wheel while in contact therewith to hollow grind the land to the rear of the cutting edge, said turning means positioning a succeeding lip for the grinding operation after the wheel has been moved out of grinding position.

11. In a machine for grinding twist drills having a plurality of cutting lips, a rotatable grinding wheel, means for oscillating the same to and fro across the face of the tool out of contact therewith during movement in one direction and in grinding contact therewith during movement in the other direction, means for causing the wheel to feed onto the work during grinding contact therewith and movement thereacross, means for limiting the said movement of the wheel onto the work to shape the lip with the desired clearance angle, means for turning the tool as the grinding wheel is moved across the lip and at a predetermined point of travel of the wheel whereby a slight depression is formed at the rear of each land and just forward of the point of web intersection.

12. In a machine for grinding twist drills having a plurality of cutting lips, a support for the drill, a rotatable grinding wheel, an oscillatable frame for supporting the grinding wheel, means for oscillating the frame to move the wheel to and fro across the end of the tool, means for moving the frame to position the wheel out of grinding relation with the tool during movement in one direction, means for moving the frame to cause engagement of the wheel with the tool during its movement in the opposite direction, means whereby the wheel is fed into the work to an increasing extent as it approaches completion of said last named movement the said support being of a character to present the drill to form the lip at the desired clearance angle, and means for intermittently turning the tool to successively present the cutting lips for grinding operation.

13. In a machine for grinding twist drills having a plurality of cutting lips, a rotatable support for the drill, a rotatable grinding wheel, an oscillatable frame for supporting the wheel, means for oscillating the frame to move the wheel to and fro across the end of the drill, and means for reciprocating the frame to move the grinding wheel out of grinding relation with the drill during its movement in one direction and into engagement with the tool during its movement in the other direction whereby the rotatable wheel is drawn across the cutting lip being ground, an adjustable device limiting the extent of movement of the frame in carrying the wheel into engagement with the tool, said reciprocating means limiting the extent of movement of the wheel onto the drill during the grinding movement, and means for intermittently turning the tool to successively present the cutting lips for the grinding operation, said means including a variable speed device adapting the machine to operate on drills having different numbers of cutting lips.

14. In a machine for grinding twist drills having a plurality of cutting lips, a support for the drill, a rotatable grinding wheel, a reciprocably mounted oscillatable frame supporting said wheel, a cam adapted to move the frame and cause the wheel to move out of grinding relation with the tool during the movement of the frame in one direction, a spring tending to force the frame in the opposite direction to move the wheel to grinding relation with the drill, a cam having a formed face predetermining the rapidity of movement of the wheel against the end of the drill, said face being of such character that the wheel first draws across the tool during the movement of the frame and, as the peripheral edge of the grinder approaches the point of web intersection, the wheel is moved to an increasing extent onto the work, means for intermittently turning the tool operable to begin to turn the tool just as the wheel begins to feed to an increasing extent onto the work, the intermittent turning means turning the tool to present the next lip for the grinding operation when the wheel frame has been moved outward withdrawing the wheel from grinding relation with the drill.

15. In a machine for grinding twist drills having a plurality of cutting lips, a rotatable drill support, a rotatable grinding wheel, an oscillating frame supporting the wheel, means for oscillating the frame to and fro across the end of the drill, a cam through operation of which the wheel is held out of grinding relation with the tool during movement in one direction and engages the drill to an increased extent during movement in the other direction, a table for the drill support providing a way, means for adjusting the drill support on the way to accommodate drills of different lengths, and means for intermittently rotating the support to turn the drill to successively present the cutting lips thereof for the grinding operation, said intermittently rotating means including a speed changing device operable in timed relation with the movement of the grinding wheel adapting the machine to grind drills of various numbers of cutting lips.

16. In a machine for grinding twist drills having a plurality of cutting lips, means for holding the drill, a rotatable grinding wheel, a frame carrying the wheel, a rock shaft on which the frame is secured, a rock arm for the shaft, a rotatable crank for rocking the arm and causing the wheel to oscillate to and fro across the cutting end of the drill, bearings for the rock shaft in which the shaft is longitudinally movable, a cam adapted to move the shaft and cause the wheel to move out of grinding relation with the tool during its movement in one direction, a spring tending to cause movement of the shaft to bring the wheel to grinding relation with the drill during reverse movement of the wheel, a cam device permitting the rock shaft and consequently the wheel to move onto the work in a predetermined manner under action by the spring, and intermittently operable means for turning the drill holding means to successively present the cutting lips thereof for the grinding operation.

17. In a machine for grinding twist drills having various numbers of cutting lips, a rotatable grinding wheel, means for moving the wheel into and out of grinding relation with the drill, and means for intermittently turning the drill to successively present the lips thereof for the grinding operation, said intermittently turning means comprising a rotatable device for holding the drill, a driving means therefor including gears of different diameters, a mutilated driving gear therefor, and a series of idler gears interposed between the mutilated gear and said gears of different diameters, the mutilated gear causing cessation of operation of the idler gears once during each revolution of the mutilated gear, the gears of different diameters being adapted to be separately connected with the driving shaft at will and predetermining the extent to which the drill may be turned during each revolution of the mutilated gear.

18. In a machine for grinding twist drills having various numbers of cutting lips, a rotatable grinding wheel, a means for rotating the wheel, means including a main drive shaft for oscillating the wheel to and fro across the end of the drill, a cam on said main driving shaft operating to cause the wheel to move out of grinding relation with the drill during movement in one direction and into grinding relation therewith during movement in the other direction, means for holding the drill, said means including a rotatable spindle, means for intermittently turning the spindle, said means including a drive shaft, a series of loosely mounted gears of different diameters on said shaft, a series of idler gears corresponding thereto, a mutilated driving gear for the idler gear group, said driving gear being on the said main shaft and adapted to cause cessation of movement of the idler gear group once during each revolution of the main shaft and said cam thereon controlling movement of the grinding wheel into and out of grinding relation with the drill, a shifting device whereby one or the other of the loosely mounted gears on the driving shaft for the spindle may be secured thereto to cause the spindle to turn part of a revolution according to the number of cutting lips of the drill whereby the spindle is intermittently turned to present successive lips of the drill for the grinding operation.

19. In a machine for grinding twist drills having a plurality of cutting lips, means for holding the drill for the grinding operation, said means including a rotatable spindle, a rotatable grinding wheel, means for oscillating the grinding wheel to and fro across the end of the tool, means for holding the grinding wheel out of grinding relation with the drill during movement in one direction, a spring for feeding the wheel forward onto the drill during movement in the opposite direction, a cam controlling the feeding movement of the wheel onto the work, intermittently operable means for rotating the spindle to successively present the lips of the drill for the grinding operation, said means beginning to turn the drill previous to movement of the grinding wheel out of engagement therewith and presenting the next lip of the drill in grinding position when the wheel has been moved out of grinding position.

20. In a machine for grinding twist drills having a plurality of cutting lips, a support for the drill adapted to hold the same for the grinding operation, a rotatable grinding wheel, means for moving the grinding wheel into and out of grinding relation with the drill, said means comprising a cam for moving the wheel away from the drill, and a spring for moving the wheel onto the work, said cam having a portion formed to predetermine the rapidity of feeding movement of the wheel after engaging the work, and means for intermittently turning the drill to successively present the cutting lips thereof for the grinding operation.

21. In a machine for grinding twist drills, a holder for the drill, a rotatable grinding wheel movable across the drill to grind the same, means for moving the grinding wheel into the work to an increasing extent as the grinding wheel finishes its movement, and means operable to turn the drill as the wheel finishes its grinding movement.

22. In a machine for grinding twist drills, a holder for the drill, automatic mechanism for turning the drill intermittently to bring successive lips to grinding position, a rotatable grinding wheel movable across the drill to grind the same, and mechanism for moving the wheel to engage the drill during part of the grinding movement and thereafter to an increasing extent into the work as the wheel finishes its grinding movement, said drill turning means operating to turn the drill as the wheel is fed into the work to an increasing extent.

23. In a machine for grinding twist drills, a holder for the drill, a grinding wheel movable across the drill point in a plane in fixed angular relation to the longitudinal axis of the drill throughout its grinding movement, means for turning the drill during the grinding movement of the wheel, and means for causing the grinding wheel to feed into the work as the drill as turned.

24. In a machine for grinding twist drills having a plurality of lips, a holder for the drill, a grinding wheel, the grinding face of which at the point of contact with the drill is at a fixed angle to the axis of the drill, means for causing relative movement of one of the elements to grind the drill end, automatic means for turning the drill during the grinding and to increase the extent of cutting action while the drill is being turned and just as the point of the drill passes the edge of the cutting surface, and automatic means for presenting successive lips of the drill for the grinding operation.

25. In a machine for grinding twist drills, a grinding wheel, a drill holder and automatic mechanism for causing a relative movement of the said elements to grind the face of each lip of the drill in the form of an oblique helicoid in which all radial lines at the surface are practically parallel with the imaginary cone formed by rotation of the cutting edge of the lip to near the point of the web intersection and extending to the point on a curve providing an increased clearance forward of the point at the rear of the lip.

26. In a machine for grinding twist drills, a grinding wheel, a holder for the drill, means for causing relative movement of said elements to grind a lip of the drill and for causing one of the elements to move toward the other during the grinding interval whereby the face of the lip has the form of an oblique helicoid with all radial lines at the surface practically parallel with the cone formed by rotation of the cutting edge of the lip to near the point of web intersection and extending to the point on a curve thereby providing an increased clearance forward of the point at the rear of the lip, and means for turning the drill to subject the lips thereof successively to the grinding operation.

In testimony whereof, I sign this specification.

EDD C. OLIVER.